United States Patent
Cohen et al.

[15] 3,664,974
[45] May 23, 1972

[54] PHOSPHORUS CONTAINING POLYMERS

[72] Inventors: Margalit Cohen; Kenneth E. MacPhee, both of Guelph, Ontario, Canada

[73] Assignee: Uniroyal, Ltd., Montreal, Quebec, Canada

[22] Filed: Feb. 19, 1970

[21] Appl. No.: 12,858

[52] U.S. Cl. ..................260/2 P, 424/78, 252/49.8, 252/49.9, 252/351, 252/357, 260/2.5 R, 260/2.5 AJ, 260/16, 260/17, 260/30.6 R, 260/47 P, 260/79, 260/857, 260/858, 260/860, 260/865, 260/874, 260/876 R, 260/880 R, 260/887, 260/893, 260/897 R, 260/899, 260/920, 260/928, 260/929, 260/944, 260/947, 260/948, 260/950, 260/953

[51] Int. Cl. ....................C08g 33/16, C08g 49/04

[58] Field of Search...........................260/2 P, 79

[56] References Cited

UNITED STATES PATENTS 2,372,244    3/1945    Adams et al..................260/2 P

FOREIGN PATENTS OR APPLICATIONS 935,926    9/1963    Great Britain..................260/2 P

*Primary Examiner*—Samuel H. Blech
*Attorney*—Thomas A. Beck

[57] ABSTRACT

New compositions of matter which are reaction products of a phosphate ester containing active groups such as —OH, —NH$_2$ and —SH and sufficient phosphorus trihalide or phosphorus oxyhalide to produce a polymer which is used as a fire retardant in plastic compositions.

14 Claims, No Drawings

PHOSPHORUS CONTAINING POLYMERS

BACKGROUND OF THE INVENTION

1. Description of the Prior Art

United States Pat. No. 2,372,244 states that the reaction of trihydroxyalkyl phosphates with chlorinating agents such as phosphorus trichloride causes a replacement of the hydroxyl group with a halogen and not a phosphorylation of the polyol as in the present invention.

British Pat. Nos. 927,175, 925,570 and 935,926 disclose the use of reaction products of phosphorus trichloride or phosphorus oxychloride with glycols or tris(hydroxymethyl) phosphine oxide for manufacturing polyurethane products.

2. Summary of the Invention

The present invention relates to a novel phosphorus containing polymer composition which is formed by the reaction of phosphorus oxyhalides or phosphorus trihalides and a phosphorus polyol or phosphate ester containing active groups such as $-OH$, $-NH_2$ and $-SH$. The phosphorus polyol is formed by the reaction of phosphoric acid with an alkylene oxide.

It has been determined that the reaction products of the present invention vary, depending upon whether a 1:1, 1:2 or 1:3 molar ratio of phosphorus trihalide or oxyhalide to phosphorus polyol is used. It appears that the reaction products comprise phosphate polymers, phosphate-phosphite polymers and phosphate-phosphonate polymers which are thought to be highly cross-linked when a 1:1 mole ratio of reactants is used. The 1:2 mole ratio of reactants presumably produces a product which has a certain amount of cross-linking, but not as much as the product resulting from the 1:1 ratio.

The phosphorus halides used as one of the reactants in the present invention have the general formula:

I

wherein X is chlorine, bromine, or iodine, R is chlorine, bromine, iodine, alkyl, aryl, alicyclic, alkoxy or aryloxy, and Z is oxygen or nothing. Examples of suitable phosphorus halides are phosphorus oxychloride, phosphorus oxybromide, phosphorus trichloride, phosphorus tribromide or any phosphorus dichloride.

The phosphorus polyols used as the other reactant in accordance with the present invention may be prepared according to U.S. Pat. No. 2,372,244 which is hereby incorporated by reference herein, and have the formula:

II

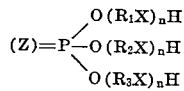

wherein $R_1$, $R_2$ and $R_3$ are the same or different and are alkylenes or chloro-, bromo- or iodo- mono-substituted alkylenes which have two to eight carbon atoms, n is an integer from 1 to 10, preferably 1 to 1.5, and X is $-O$, $-S$, or $-NH$ and Z is oxygen or nothing. An especially preferred phosphorus polyol is tris(hydroxychloropropyl) phosphate.

As disclosed in U.S. Pat. No. 2,372,244 noted, the phosphorus polyols used in the present invention are prepared by reacting a phosphorus acid with an alkylene oxide.

The phosphorus acids used in the preparation of the phosphorus polyol are those acids corresponding to a $P_2O_5$ equivalency of from about 72 to 95 percent. Representative acids include phosphorous acid, 100 percent phosphoric acid, pyrophosphoric acid, polyphosphoric acid, various metaphosphoric acids, various partial esters of said acids and mixtures of any of the above acids and/or esters. It is essential that the acids selected have a $P_2O_5$ equivalency of from about 72 percent to about 95 percent. If the acid has a $P_2O_5$ equivalency of substantially less than 72 percent, water will be present and react with alkylene oxide to form undesired glycols.

The alkylene oxides which are reacted with the aforementioned acids to form a phosphorus polyol contain an oxirane ring. Suitable alkylene oxides include ethylene oxide, propylene oxide, the isomeric and normal butylene oxides, hexylene oxides, octylene oxides, dodecene oxides, methoxy and other alkoxy propylene oxides, styrene oxide or substituted styrene oxide and cyclohexene oxide or substituted cyclohexene oxide.

Halogenated alkylene oxides may also be used such as epichlorohydrin, epiiodohydrin, epibromohydrin, 3,3-dichloropropylene oxide, 3-chloro-1,2-epoxypropane, 3-chloro-1,2-epoxybutane, 1-chloro-2,3-epoxybutane, 3,4-dichloro-1,2-epoxybutane, 1,4-dichloro-2,3-epoxybutane, and 3,3,3-trichloropropylene oxide. Mixtures of any of the above alkylene oxides may also be employed. The reaction products of all acids and alkylene oxides noted above result in the formation of phosphorus polyols which can be used in the practice of the present invention.

The reaction of the phosphorus halide and phosphorus polyol may be carried out either in the presence or absence of a solvent. If a solvent is used it is preferably a polar solvent which includes but is not limited to hydrocarbon or chlorinated hydrocarbon solvents such as chlorobenzene etc. The reaction is conducted at a temperature of from about 25° to 180° C., preferably 80° to 140° C. for a period of 30 minutes to 30 hours. During the reaction period, it is necessary to maintain an inert gas atmosphere in the reaction vessel. Such gases as nitrogen, carbon dioxide or any other inert gas may be effectively used for this purpose.

Any residual hydrogen chloride gas formed during the reaction is removed from the reaction mixture by heating under vacuum after the reaction is complete.

It is believed that the polymeric products of the present invention are the result of a reaction between a halogen of the phosphorus halide or oxyhalide and an available hydrogen present in the phosphorus polyol. The exact structure resulting from any particular reaction is not certain. As noted previously there are polymeric phosphates present along with polymeric phosphate-phosphite, polymeric phosphate-phosphonate compounds, and possibly some cyclization products which result from the reaction. It is preferable to avoid specific structures for the products of this invention and therefore these products are characterized by hydroxyl number, phosphorus content, and viscosity.

The products of the present invention are useful as fire retardants in polyurethane, polyester, or thermoplastic materials, in textiles, in foams, in coatings and in laminates. The phosphorus containing polymers may also be used as surface active agents, antistatic agents, fuel or lubricant additives, plasticizers for synthetic resins, insecticides, etc.

The following examples serve to illustrate the invention. All temperatures are given in degrees Centigrade.

EXAMPLE 1.

Preparation of polyhydroxychloropropyl phosphate by reacting tris(hydroxychloropropyl) phosphate (polyol) with phosphorus oxychloride in molar ratio of 3:1.

Tris(hydroxychloropropyl phosphate)(II, 442.6 g., 0.9 moles) formed by reacting phosphoric acid and epichlorhydrin at a 1:4 ratio so that n = 1.33) is added to a 2-liter flask equipped with a thermometer, reflux condenser, dropping funnel with dip tube, and a nitrogen purge. Phosphorus oxychloride (42.2 g., 0.3 mole) is added slowly over a 1-hour period. The temperature of the reaction mixture is slowly raised from ambient to 50° and held at this temperature for 2 hours, then increased gradually over the next hour to 130°-145°. The reaction mixture is then heated at this temperature for an additional 2 to 8 hours or until no more hydrogen chloride is evolved. Residual hydrogen chloride is removed by heating the product at 140° under vacuum (20 mm. Hg) for 1 hour.
Product:
  Viscous liquid—457.3 g.
  % Phosphorus—7.6, calc. 8.0
  Hydroxyl number—157, calc. 164

EXAMPLE 2

Preparation of polyhydroxychloropropyl phosphate by reacting polyol with phosphorus oxychloride in molar ratio of 2:1.

Tris(hydroxychloropropyl) phosphate (II, 421.7 g., 0.86 mole) is heated from ambient temperature to 50° in a flask equipped as in example 1 and the reaction mixture maintained at this temperature for 2 hours during the addition of 67.0 g. (0.43 mole) of phosphorus oxychloride. During the next hour the reaction mixture is heated to 100° and held at this temperature for about 30 hours.

The residual hydrogen chloride is removed from the product at 20 mm. Hg and 100° during 1 hour.
Product:
  Very viscous liquid—443.0 g.
  % Phosphorus—8.5, calc. 8.9
  Hydroxyl number—93, calc. 105

EXAMPLE 3

Preparation of highly cross-linked polyhydroxychloropropyl phosphate by reacting polyol with phosphorus oxychloride in molar ratio of 1:1.

Phosphorus oxychloride (111 g., 0.71 mole) is added dropwise to 350 g. (0.71 mole) of the tris(hydroxychloropropyl phosphate) (II, $n = 1.33$) as described in example 1, at room temperature during a 2-hour period. During the next 40 to 60 minutes the temperature of the reaction mixture is increased gradually to 90°—100° whereupon the reaction mixture gels.
Product:
  Dark amber gel—400 g.
  % Phosphorus—8.0, calc. 11.4

EXAMPLE 4

Preparation of polyhydroxychloropropyl phosphate-phosphite by reacting polyol with phosphorus trichloride in molar ratio of 3:1.

Phosphorus trichloride (30.3 g., 0.22 mole) is added to 324.5 g. (0.66 mole) tris(hydroxychloropropyl phosphate) (II, $n = 1.33$) as described in example 1, during a 4-hour period. The reaction is exothermic and the hydrogen chloride is evolved immediately. After addition of phosphorus trichloride is completed, the reaction mixture is agitated for 1.5 hours, then heated gradually to 120° during the next 60 minutes and held at this temperature for an additional 1.5 hours or until hydrogen chloride is no longer evolved. Residual hydrogen chloride is removed at 20 mm. Hg. and 70° during 1.5 hours.
Product:
  Amber liquid—349 g.
  Brookfield viscosity at 32° C.—40,000 cps.
  Brookfield viscosity at 50° C.—8,000 cps.
  % Phosphorus—7.9 calc. 8.3
  Hydroxyl number—175, calc. 220

EXAMPLE 5

Preparation of polyhydroxychloropropyl phosphate-phosphite by reacting polyol with phosphorus trichloride in molar ratio of 2:1.

The preparation is carried out using the procedure described in example 4 except that 356.6 g. (0.72 mole) of tris(hydroxychloropropyl) phosphate (II, $n = 1.33$) is reacted with 49.5 g. (0.36 mole) phosphorus trichloride.
Product:
  Amber viscous liquid—380 g.
  Brookfield viscosity at 32° C.—160,000 cps.
  Brookfield viscosity at 50° C.—130,000 cps.
  % Phosphorus—8.8, calc. 9.9
  Hydroxyl number—134, calc. 112

EXAMPLE 6

Preparation of highly cross-linked polyhydroxychloropropyl phosphate-phosphite by reacting polyol with phosphorus trichloride in molar ratio of 1:1.

The preparation is carried out using the procedure as described in example 1 except that 326.5 g. (0.66 mole) of tris(hydroxychloropropyl) phosphate (II, $n = 1.33$) is reacted with 89.0 g (0.66 mole) of phosphorus trichloride.
Product:
  Very viscous liquid—350 g.
  Brookfield viscosity at 32° C.—680,000 cps.
  Brookfield viscosity at 50° C.—100,000 cps.
  % Phosphorus—10.0, calc. 11.8

The properties of the products of examples 1–6 are set forth in table I.

TABLE I.—PROPERTIES OF PHOSPHORUS CONTAINING POLYMERS

| Example Number | Reactants | | | | Products | | | | |
| --- | --- | --- | --- | --- | --- | --- | --- | --- | --- |
| | Polyol | Moles | Halide | Moles | OH Number | | P, percent | | Viscosity Brookfield cps., 32° C. and (50°) |
| | | | | | Calc. | Found | Calc. | Found | |
| 1 | Tris(hydroxychloropropyl)phosphate | 3 | POCl₃ | 1 | 164 | 157 | 8.0 | 7.6 | |
| 2 | do | 2 | POCl₃ | 1 | 105 | 93 | 8.9 | 8.5 | |
| 3 | do | 1 | POCl₃ | 1 | 0 | | 11.4 | 8.0 | |
| 4 | do | 3 | PCl₃ | 1 | 220 | 175 | 8.3 | 7.9 | 40,000 (8,000) |
| 5 | do | 2 | PCl₃ | 1 | 112 | 134 | 9.9 | 8.8 | 160,000 (130,000) |
| 6 | do | 1 | PCl₃ | 1 | 0 | | 11.8 | 10.0 | 680,000 (100,000) |

As noted previously, the addition of a phosphorus containing polymer of the present invention to a thermoplastic or thermosetting matrix polymer results in a fire resistant blend.

The flame resistant thermoplastic or thermosetting matrix polymers [such as polyesters, polyurethanes (both polyether and polyester based), ABS resins (grafts and blends), polyvinyl resins such as polyvinyl chloride, polystyrene etc. and polyethylene and polypropylene] must contain sufficient phosphorus containing polymer so that the blend possesses a phosphorus content between about 0.1 and 10 percent based on the total weight of the blend. Thus the actual amount of phosphorus containing polymer to be added to the blend will vary depending upon the phosphorus content of that polymer.

In many instances, the polymer matrix is self-extinguishing but the additives which are added to the polymer for various reasons, cause the mixture to burn. The polymers of the present invention also inhibit any such flammability caused by said additives when blended with an additive-containing matrix polymer.

Any convenient known method can be used to blend the matrix polymer and the phosphorus containing polymer of the present invention.

The following examples illustrate blends of various matrix polymers and the polymers of the present invention.

EXAMPLE 7

Polyester casting containing polyhydroxychloropropyl phosphate.

An alkyd is prepared using the following reactants:

| | |
|---|---|
| Tetrachlorophthalic anhydride | 1.05M |
| Fumaric anhydride | 0.95M |
| Ethylene glycol | 2.20M |

The alkyd is blended with styrene (30 pph.) and the resulting unsaturated polyester contains 21 percent chlorine.

A polyester casting is prepared from 175 parts of said polyester, 3.5 parts benzoyl peroxide paste and 17 parts polyhydroxychloropropyl phosphate (product of example 2).

This casting tested by A.S.T.M. D-1692-59T continues to burn for 28 seconds after removal of the flame and therefore is classed as non-burning. The same casting shows a burning rate of ⅛ in./min. when tested by A.S.T.M. D757 (Globar).

Polyester castings prepared without polyhydroxychloropropyl phosphate continue to burn 4 minutes and 25 seconds after removal of the flame when tested by A.S.T.M. D-1692-59T.

The results of these burning tests are summarized in table II.

EXAMPLE 8

Polyester casting containing polyhydroxychloropropyl phosphate-phosphite.

A polyester casting is prepared by admixing 175 parts polyester (having a composition described in example 7), 3.5 parts benzoyl peroxide paste and 17 parts polyphosphate-phosphite ester (prepared in example 4).

The results of the burning tests are summarized in table II.

EXAMPLE 9

Polyester casting containing polyhydroxychloropropyl phosphate-phosphite.

A polyester casting is prepared as described in example 7 except that 17 parts of the polyhydroxychloropropyl phosphate-phosphite described in example 5 is substituted for the product of example 2. The results of the burning tests are presented in table II.

EXAMPLE 10

Polyester casting containing highly cross-linked polyhydroxychloropropyl phosphate-phosphite.

A polyester casting is prepared as described in example 7 except that 17 parts of the phosphorus containing polymer described in example 6 is substituted for that described in example 2. The results of the burning tests are presented in table II.

TABLE II

Flammability Tests of Polyester Castings Utilizing Phosphorus Containing Polymers

| Example No. | Phosphorous[1] containing Polymer from example | ASTM D-757 in./min. | ASTM D-1692-59T class | Burning Tests Time until extinguishing secs. |
|---|---|---|---|---|
| 7 | 2 | 1/8 | NB[2] | 28 |
| 8 | 4 | 1/12 | NB | 17 |
| 9 | 5 | 1/8 | NB | 15 |
| 10 | 6 | 1/12 | NB | 25 |

[1] 10 pph in polyester casting
[2] non-burning

EXAMPLE 11

Preparation of semi-flexible polyurethane foam utilizing polyhydroxychloropropyl phosphate-phosphite.

A semi-flexible polyurethane foam was prepared using methods known to those skilled in the art, by reacting the following compounds:

| | Parts |
|---|---|
| 3,000 mol. wt. triol, polyether-based (Dow Voranol CP 3001) | 190.0 |
| 260 mol. wt. triol (Dow Voranol CP 260) | 10.0 |
| 33% triethylene diamine in dipropylene glycol (Houdry Dabco 33 LV) | 4.0 |
| Dibutyl tin dilaurate (M & T Corp. D 22) | 3.5 |
| Water | 4.0 |
| Silicon (Union Carbide L 5320) | 1.0 |
| Reaction product of Example 4 | 30.0 (8.2%) |
| Polymeric isocyanate Mobay Mondur - MR | 124.0 |

The resultant material was molded and cut into strips and its flammability tested.

The foam did not shrink and had good flame resistance. It was self-extinguishing according to ASTM D-1692-59T and had a burning rate of 0.6 in./min.

Polyurethane foam prepared without the product of example 4 burned readily at a rate of 1.5 in./min. when tested by ASTM D-1692-59T.

EXAMPLE 12

Preparation of rigid polyurethane foam using polyhydroxychloropropyl phosphate-phosphite.

A rigid polyurethane foam was prepared using methods known to those skilled in the art by reacting the following compounds:

| | Parts |
|---|---|
| Reaction product of Example 4 | 100.0 (42%) |
| Silicone (Union Carbide L-5320) | 1.5 |
| 33% triethylene diamine in dipropylene glycol (Houdry Dabco 33 LV) | 10.0 |
| Dibutyl tin dilaurate (M & T Corp. D-22) | 5.0 |
| Water | 4.0 |
| Polymeric isocyanate Mobay Mondur-MR | 118.0 |

The foam did not shrink and was non-burning according to ASTM D-1692-59T.

Rigid foam prepared using Voranol CP 3001 instead of the phosphorus containing polymer (example 4) in the above formulation burned readily at a rate of 5.7 in./min. when tested by ASTM D-1692-59T.

EXAMPLE 13

Flame retardant thermoplastic resin containing polyhydroxychloropropyl phosphate-phosphite.

A non-burning flexible polyvinyl chloride (PVC) containing flammable plasticizers is prepared from:

| | |
|---|---|
| Polyvinyl chloride (Uniroyal Marvinol VR-22) | 100 parts |
| Di-isooctyl phthalate | 45 parts |
| Phosphite chelator - (Mark C Argus) | 6 parts |
| Nepheline syenite (filler) | 24 parts |
| Reaction product of Example 4 | 15 parts (7.5%) |

The components are milled together on a two-roll mill at about 170°. The resulting composition is molded into strips 6 in. in length, 5 in. in width and 0.125 in. in thickness. Strips (2 × 5 in.) cut from the molded composition are then subjected to ASTM D-1692-59T flame retardance test. The results are reported in table III.

EXAMPLE 14

Flame retardant thermoplastic resin containing polyhydroxychloropropyl phosphate-phosphite.

A non-burning flexible polyvinyl chloride containing flammable plasticizers is prepared from:

| | |
|---|---|
| Polyvinyl chloride (Uniroyal Marvinol VR-22) | 100 parts |
| Di-isooctyl phthalate | 55 parts |
| Phosphite chelator - Mark C Argus | 6 parts |
| Nepheline syenite (filler) | 24 parts |
| Reaction product of Example 5 | 10 parts (5.1%) |

Strips are prepared from the milled and molded composition as described in example 13 and are then subjected to ASTM D-1692-59T flame retardance test. The results are reported in table III.

EXAMPLE 15

Flame retardant thermoplastic resin containing polyhydroxychloropropyl phosphate-phosphite.

A non-burning flexible polyvinyl chloride containing flammable plasticizers is prepared from:

| | |
|---|---|
| Polyvinyl chloride (Uniroyal Marvinol VR-22) | 100 parts |
| Di-isooctyl phthalate | 55 parts |
| Phosphite chelator - Mark C Argus | 6 parts |
| Nepheline syenite (filler) | 24 parts |
| Reaction product of Example 6 | 13.3 parts (6.6%) |

Strips are prepared from milled and molded composition as described in example 13 and are then subjected to ASTM D-1692-59T flame retardance test. The results are reported in table III.

EXAMPLE 16

Flame retardant acrylonitrile-butadiene-styrene resin containing polyhydroxychloropropyl phosphate-phosphite.

This phosphorus containing polymer is obtained by reacting tris(hydroxychloropropyl) phosphate with phosphorus trichloride in molar ratio of 3:2. The preparation is carried out as in example 4.

Following the milling and molding procedure of example 13, fire retardant acrylonitrile-butadiene-styrene resin (ABS) samples are prepared from 100 parts Uniroyal Kralastic MH 1801 and 15 parts or 13.1 percent polyhydroxychloropropyl phosphate-phosphite, prepared as described in the previous paragraph.

The samples are tested by a modified ASTM burning test. In order to prevent dripping of the melted sample, ASTM Test D-1692-59T is modified by placing the sample on a sheet of asbestos paper (size 2.25 × 5 in., with 90° folds ⅛ in. wide along each 5 in. side).

Results of the flammability test are reproducible and comparable, and are presented in table III.

TABLE III

Flammability of Thermoplastic Materials Containing Polyhydroxychloropropyl Phosphate-Phosphite

| Example | Matrix Polymer | Phosphorus containing Polymer | ASTM Method | Time until extinguishing | Inches remain |
|---|---|---|---|---|---|
| 13 | PVC | | D-1692-59T | 52 sec. | 4.0 |
| 14 | PVC | from Ex. 4 | D-1692-59T | 32 sec. | 4.2 |
| 15 | PVC | from Ex. 5 | D-1692-59T | 33 sec. | 4.3 |
| | PVC | from Ex. 6 | D-1692-59T | 15 sec. | 4.3 |
| | ABS | — | D-1692-59T modified | 15 min. 36 sec. | 1.6 |
| 16 | ABS | from Ex. 16 | D-1692-59T modified | 5 min. 44 sec. | 3.7 |

Having thus described the invention what we claim and desire to protect by Letters Patent is:

1. A phosphorus containing polymer which comprises the reaction product of:

A. a phosphorus halide having the general formula:

wherein X is chlorine, bromine or iodine, R is chlorine, bromine, iodine, alkyl, aryl, alicyclic, alkoxy, or aryloxy, and Z is oxygen or nothing; and B. a phosphorus containing ester having the formula:

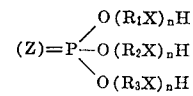

wherein $R_1$, $R_2$ and $R_3$ are selected from at least one of the group consisting of alkylene compounds having two to eight carbon atoms and halogen substituted alkylene compounds having two to eight carbon atoms, $n$ is an integer between 1 and 10, X is selected from the group consisting of —O, —S, or —NH or mixtures thereof, and Z is oxygen or nothing; wherein the molar ratio of reactants of (A) and (B) respectively is between 1:1 and 1:3.

2. The polymer of claim 1 wherein $n$ in (B) is between 1 and 1.5.

3. The polymer of claim 2 wherein (A) is phosphorus oxychloride and (B) is tris(hydroxychloropropyl) phosphate.

4. The polymer of claim 2 wherein (A) is phosphorus trichloride and (B) is tris(hydroxychloropropyl) phosphate.

5. The polymer of claim 2 wherein (A) is phosphorous tribromide and (B) is tris(hydroxychloropropyl) phosphate.

6. The polymer of claim 2 wherein (A) is phosphorus oxybromide and (B) is tris(hydroxychloropropyl) phosphate.

7. The polymer of claim 2 wherein (A) is phosphorus oxychloride and (B) is tris(hydroxyethyl) phosphate.

8. The polymer of claim 2 wherein (A) is phosphorus trichloride and (B) is tris(hydroxyethyl) phosphate.

9. The polymer of claim 2 wherein (A) is phosphorus tribromide and (B) is tris(hydroxyethyl) phosphate.

10. The polymer of claim 2 wherein (A) is phosphorus oxybromide and (B) is tris(hydroxyethyl) phosphate.

11. The polymer of claim 2 wherein (A) is phosphorus oxychloride and (B) is tris(hydroxypropyl) phosphate.

12. The polymer of claim 2 wherein (A) is phosphorus trichloride and (B) is tris(hydroxypropyl) phosphate.

13. The polymer of claim 2 wherein (A) is phosphorus tribromide and (B) is tris(hydroxypropyl) phosphate.

14. The polymer of claim 2 wherein (A) is phosphorus oxybromide and (B) is tris(hydroxypropyl) phosphate.

* * * * *